United States Patent [19]

Edwards et al.

[11] Patent Number: 5,649,090
[45] Date of Patent: Jul. 15, 1997

[54] FAULT TOLERANT MULTIPROCESSOR COMPUTER SYSTEM

[75] Inventors: David S. Edwards; William A. Shelly; Jiuyih Chang, all of Phoenix; Minoru Inoshita, Glendale; Leonard G. Trubisky, Scottsdale, all of Ariz.

[73] Assignee: Bull hn Information Systems Inc., Billerica, Mass.

[21] Appl. No.: 708,965

[22] Filed: May 31, 1991

[51] Int. Cl.$^6$ .................................................. G06F 11/00
[52] U.S. Cl. ........................... 395/182.08; 395/185.07
[58] Field of Search .................... 395/575; 371/9.1, 371/68.3, 68.1

[56] References Cited

U.S. PATENT DOCUMENTS

| | | | |
|---|---|---|---|
| 4,084,236 | 4/1978 | Chelberg et al. | 364/200 |
| 4,245,307 | 1/1981 | Kapeahian et al. | 364/200 |
| 4,464,747 | 8/1984 | Groudon et al. | 371/50 |
| 4,920,479 | 4/1990 | Hashiguchi | 364/265 |
| 4,953,164 | 8/1990 | Asakura et al. | 371/40.1 |
| 4,975,838 | 12/1990 | Mizuno et al. | 364/200 |
| 5,195,101 | 3/1993 | Guenthner et al. | 371/68.3 |
| 5,212,784 | 5/1993 | Sparks | 395/575 |
| 5,271,020 | 12/1993 | Marisetty | 371/30 |

FOREIGN PATENT DOCUMENTS

| | | | |
|---|---|---|---|
| 0128353 | 12/1984 | European Pat. Off. | G11C 9/06 |
| 0348652 | 1/1990 | European Pat. Off. | G06F 11/14 |

Primary Examiner—Robert W. Beausoliel, Jr.
Assistant Examiner—Joseph E. Palys
Attorney, Agent, or Firm—J. S. Solakian; J. H. Phillips

[57] ABSTRACT

A fault tolerant computer system includes at least two central processing units each having a cache memory and a parity error detector adapted to sense parity errors in blocks of information read from and write to cache and to issue a cache parity read or write error flag if a parity error is sensed. A system bus couples the CPU to a System Control Unit having a parity error correction facility, and a memory bus couples the SCU to a main memory. An error recovery control feature distributed across the CPU, including a Service Processor and the operating system software, is responsive to the sensing of a read parity error flag in a sending CPU and a write parity error flag in a receiving CPU in conjunction with a siphon operation for transferring the faulting block from the sending CPU to main memory via the SCU (in which given faulting block is corrected) and for subsequently transferring the corrected memory block from main memory to the receiving CPU when a retry is instituted.

3 Claims, 5 Drawing Sheets

FAULT TOLERANT MULTIPROCESSOR COMPUTER SYSTEM

FIELD OF THE INVENTION

This invention relates to computer systems and, more particularly, to a multiprocessor computer system which is fault tolerant to processor siphon cache storage errors.

BACKGROUND OF THE INVENTION

One of the major challenges that traditional mainframe vendors face as personal computers and workstations become more and more powerful is in differentiating their midrange systems from the rapidly advancing smaller machines. One significant area in which mainframe machines can be made distinguishable from the smaller machines is in the area of fault tolerance.

The problem of processor cache storage errors has been a nuisance throughout the history of the use of cache memories in mainframe systems. These errors, as is true with main memory errors, can be caused by either alpha particle impact or transient (or hard) storage element failures. In the exemplary system in which the invention finds application, main memory single bit failures are masked from the system's visibility by specialized hardware in the memory controller that corrects the bit in error before the word associated with the flaw is sent to the requesting unit. However, processor cache failures are not corrected during the cache read activity because correction hardware has not been designed into the processor for a number of reasons such as the limited integrated circuit area available on the VLSI chips.

The advantages of processor cache memories greatly outweigh the complications that arise when they fail. Cache memories offer high-speed access to data and instructions that the processor would have to otherwise fetch from memory on every reference. A cache memory typically takes between 10% to 25% of the time required to access main memory, hence cache memories have gained a permanent position in system data storage hierarchy design.

Any computer design effort that incorporates a cache memory into its central processor unit architecture must address the following progressively more difficult challenges:

1. It is imperative that the processor detect a cache error condition; otherwise data corruption would result. The least expensive solution to this problem is to do nothing more than hang or crash the system when this type of error occurs, but this approach is, as a practical matter, completely unacceptable as a mainframe response.

2. A sophisticated machine should support the deconfiguration of a failing cache storage element. By merely deconfiguring an isolated failing element, the processor can continue to execute without substantial performance loss. Cache memories are divided into blocks that encompass many cache storage elements. In the exemplary machine, the block size is 16 words (64 bytes). Cache memories can also be divided into coarser subdivisions such as levels which, in this context, means a full column of blocks. The exemplary machine has been designed with logic that permits its cache blocks and cache levels to be individually deconfigured.

3. A truly sophisticated machine should ensure that if a processor cache error occurs, either the most recent copy of the block in error can be retrieved from main memory or the block in error can somehow be corrected. In the exemplary machine, an error correction code for correcting cache block single bit errors, invoked only during writes to main memory, has been implemented. But the design of this machine did not address explicit, "unnatural", correction of a specific cache block or restarting of the affected instruction. (The term "unnatural" is used in this context to indicate that it is required that the block be exchanged for correction even though the natural replacement algorithms would not dictate such an event at the time of the error.)

4. Store-into cache machines, such as the exemplary apparatus, are capable of operating extremely efficiently, but their characteristic of delaying writes to main memory which makes them performant is a liability when other processors are added to the system to further improve throughput. The multiple processor configuration leads to the ultimate challenge in cache error processing, that of handling cache operand block errors where the block in error resides in one processor's cache and is required by one or more processors and an "updated" copy of the block does not exist in the system's main memory. This problem, to which the present invention is addressed, is commonly referred to as the siphon error predicament. (Siphon is a term of art used to define the transfer of a cache block from one processor of a multi-processor system to either another processor or to an input/output unit.) The similar problem encountered in single processor systems is addressed by a related invention covered by U.S. patent application Ser. No. 07/708,420, filed on even date herewith, entitled FAULT TOLERANT COMPUTER SYSTEM, by David S. Edwards et al.

Some store-into cache prior art systems have handled the problem of processor cache errors by adding error correction hardware into each cache to correct an error as the data containing the error is read from cache. This is an effective, but expensive, solution to the problem.

A second prior art approach to solving the cache data correction and retry predicament incorporated a technique which masked the problem by implementing a store-through cache. (In store-through designs, when a cache block is updated, it is written to both the cache and immediately to main memory.) With this approach, whenever a fetch from cache is in error, the processor forces a cache bypass and issues a read-to-memory for the block which it will use both in instruction execution and to update (restore) the cache. The advantage of this solution is that the fetch from memory is identical to the cache miss condition such that the affected instruction is not impacted; therefore, all such errors can be recovered. This solution took advantage of the store-through design, which by definition provides the benefit of having main memory always up to date.

Store-into cache designs (commonly known as copy-back caches) are favored for performance oriented systems over store-through designs because they result in less processor-to-memory write activities, hence less main memory traffic which leads to less bottlenecking at the system bus when a bus design is implemented. The store-into characteristic that leads to enhanced performance necessarily results in the cache often containing the only valid copy of a particular block of data in the system. That is, when a cache block has been modified, it is not written back to main memory. Instead it is held by the cache until requested by a second active unit (CPU or I/O Unit) or until the block must be replaced at which time it is written back to main memory to make room in cache for a new block.

It will be apparent to those skilled in the art that it would be highly desirable to achieve, in an alternative approach, the advantages of these prior art solutions to the processor cache error predicament without resorting to the expense and complexity associated with the prior art solutions.

OBJECTS OF THE INVENTION

It is therefore a broad object of this invention to provide a solution to the processor cache error predicament which is straightforward and economic to implement.

It is a more specific object of this invention to provide a solution to the processor cache error predicament in the context of the problem as it applies to a system incorporating multiple processors which undertake to access one another's individual processor cache memories.

SUMMARY OF THE INVENTION

Briefly, these and other objects of the invention are achieved by a fault tolerant computer system including a plurality of Central Processing Units, each having a cache memory unit with a cache memory and a parity error detector adapted to sense parity errors in blocks of information read from and written to the cache memory unit and to issue a read or write cache parity error flag if a parity error is sensed. A system bus couples the CPU to a System Control Unit having a parity error correction facility, and a memory bus couples the SCU to a main memory. An error recovery control feature distributed across the CPU, a Service Processor and the operating system software, is responsive to the sensing of a read parity error flag in a sending CPU and a write parity error flag in a receiving CPU in conjunction with a siphon operation for transferring the faulting block from the sending CPU to main memory via the SCU (in which the given faulting block is corrected) and for subsequently transferring the corrected memory block from main memory to the receiving CPU when a retry is instituted.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENTS

Figure 1:
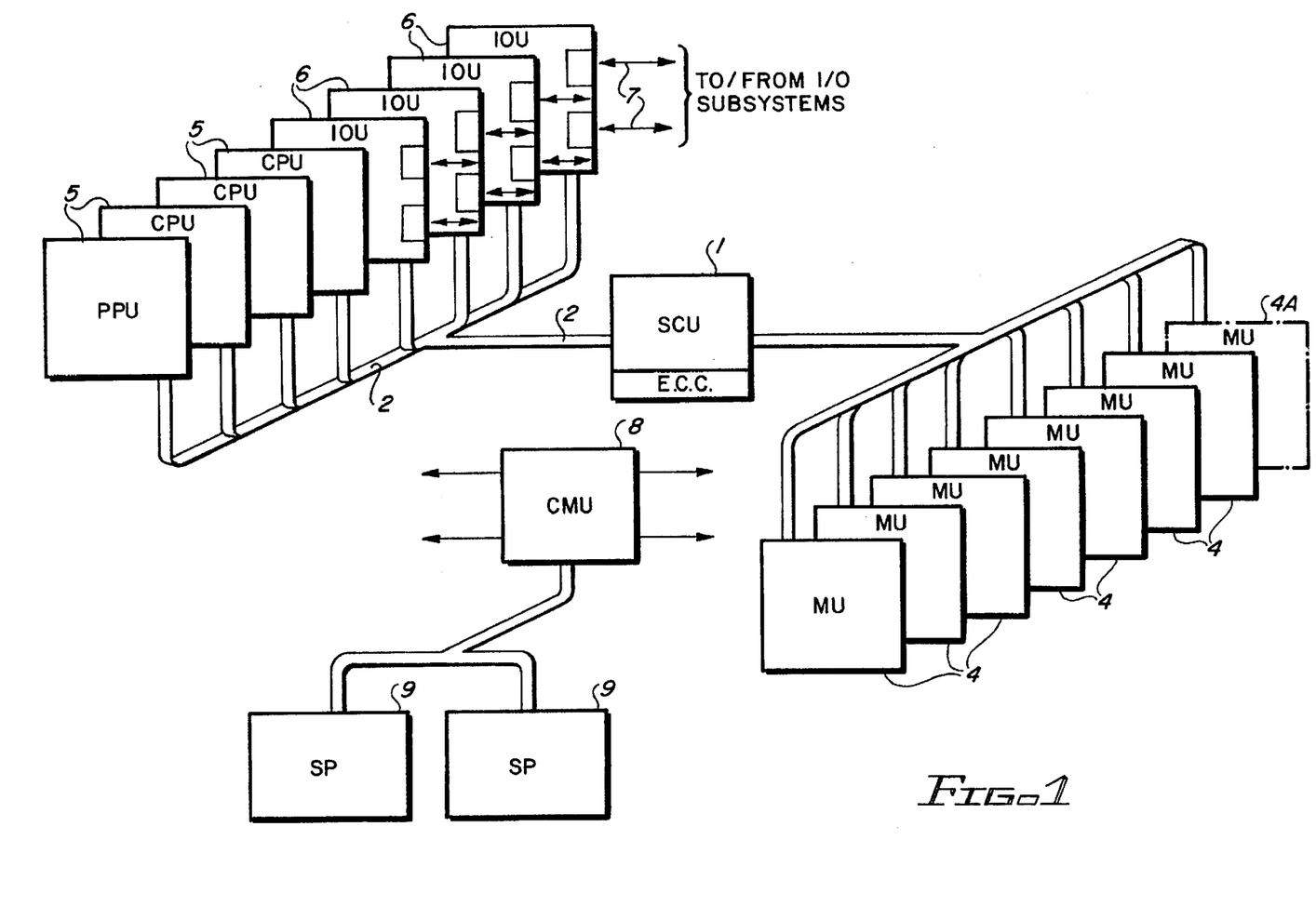
FIG. 1 is a very high level block diagram of the central system structure of an information processing system in which the subject invention finds application.

Attention is first directed to FIG. 1 which illustrates an exemplary Central Subsystem Structure (CSS) within which the subject invention may be incorporated. The System Control Unit (SCU) 1 centralizes and controls the system bus 2 and the memory bus 3 scheduling. More particularly, the SCU 1: A) performs memory control, single bit error correction and double bit error detection; B) controls the memory configuration of which there are one per Memory Unit (MU) 4; C) manages 64-byte block transfers between the Central Processing Units (CPUs) 5 and the MUs in conjunction with the store-into-cache feature of the CPUs; D) corrects single bit errors found in modified blocks of a CPU's cache or on a data transfer from a CPU, MU or Input/Output Unit (IOU) 6; and E) contains the system calendar clock.

The system bus 2 interconnects 1 to 4 CPUs and 1 to 4 IOUs with each other and with the SCU. The system bus includes a 16-byte bidirectional data interface, a bidirectional address and command interface, an SCU status interface monitored by all CPUs and IOUs, and a small number of control lines between the SCU and each individual CPU and IOU. Data is exchanged on the system bus in 16, 32 or 64-byte groups, and data exchanges can be between a CPU and an MU, an IOU and an MU, two CPUs and a CPU and an IOU. The operations through the system bus 2 are:

Read: 16, 32 or 64 bytes;
Read with exclusivity: 64 bytes;
Write from IOU: 16, 32 or 64 bytes;
Write from CPU (swapping): 64 bytes;
Interrupts and Connects;—Read/Write registers.

Every system bus operation consists of an address phase and a data phase, and an address phase can start every two machine cycles. Consecutive 16-byte data transfers within a group can occur on consecutive machine cycles. An IOU or CPU can wait for the data phase of up to two requests at the same time. The data blocks are transferred in the same order as the requests are received.

The memory bus 3 interconnects 1 to 8 MUs with the SCU. The memory bus includes a 16-byte bidirectional data interface, an address and command interface from the SCU to all MUs and a small number of control lines between the SCU and each individual MU. Data is exchanged on the memory bus in 16, 32 or 64-byte groups. The operations through the memory bus 3 are:

Read: 16, 32 or 64 bytes;
Write: 16, 32 or 64 bytes.

The main memory is composed of up to eight MUs. (A ninth slot, MU 4A, may be provided for ease of reconfiguration and repair in case of failure.) A single bit correction, double bit detection code is stored with every double word; i.e., 8 code bits for every 72 data bits. The code is arranged so that a 4-bit error within a single chip is corrected as four single bit errors in four different words. Data in an MU is addressed from the SCU in 16 byte (four word) increments. All bytes within any one MU are consecutively addressed; i.e., there is no interlace between MUs which operate in parallel. A memory cycle may start every machine cycle, and a memory cycle, as seen from a CPU, is ten machine cycles—assuming no conflicts with other units. An MU 4 contains 160 Dynamic Random Access Memory (DRAM) circuits, each of which has n by 4 bit storage elements where n=256, 1024 or 4096.

The IOUs 6 each provide a connection between the system bus 2 and two Input/Output Buses (IOBs) 7 such that each IOB interfaces with a single IOU. Thus, an IOU manages data transfers between the CSS and the I/O subsystems, not shown in FIG. 1.

A Clock and Maintenance Unit (CMU) 8 generates, distributes and tunes the clock signals for all the units in the CSS, provides the interface between the service processor(s) (SP) 9 and the central processing, input/output and power subsystems, initializes the units of the CSS and processes errors detected within the CSS units. The CSS employs a two-phase clock system and latched register elements in which the trailing edge of clock 1 defines the end of phase 1, and the trailing edge of clock 2 defines the end of phase two, each phase thus being one-half of a machine cycle.

The SP(s) 9 may be a commodity personal computer with an integrated modem for facilitating remote maintenance and operations, and large systems may include two SPs through which the system can be dynamically reconfigured for high availability. The SP performs four major functions:

- monitors and controls the CSS during initialization, error logging and diagnostic operations;
- serves as the primary operating system console during system boot or on operator command;
- serves as console and data server for the input/output subsystems Maintenance Channel Adaptor (MCA);
- provides a remote maintenance interface.

Figure 2:
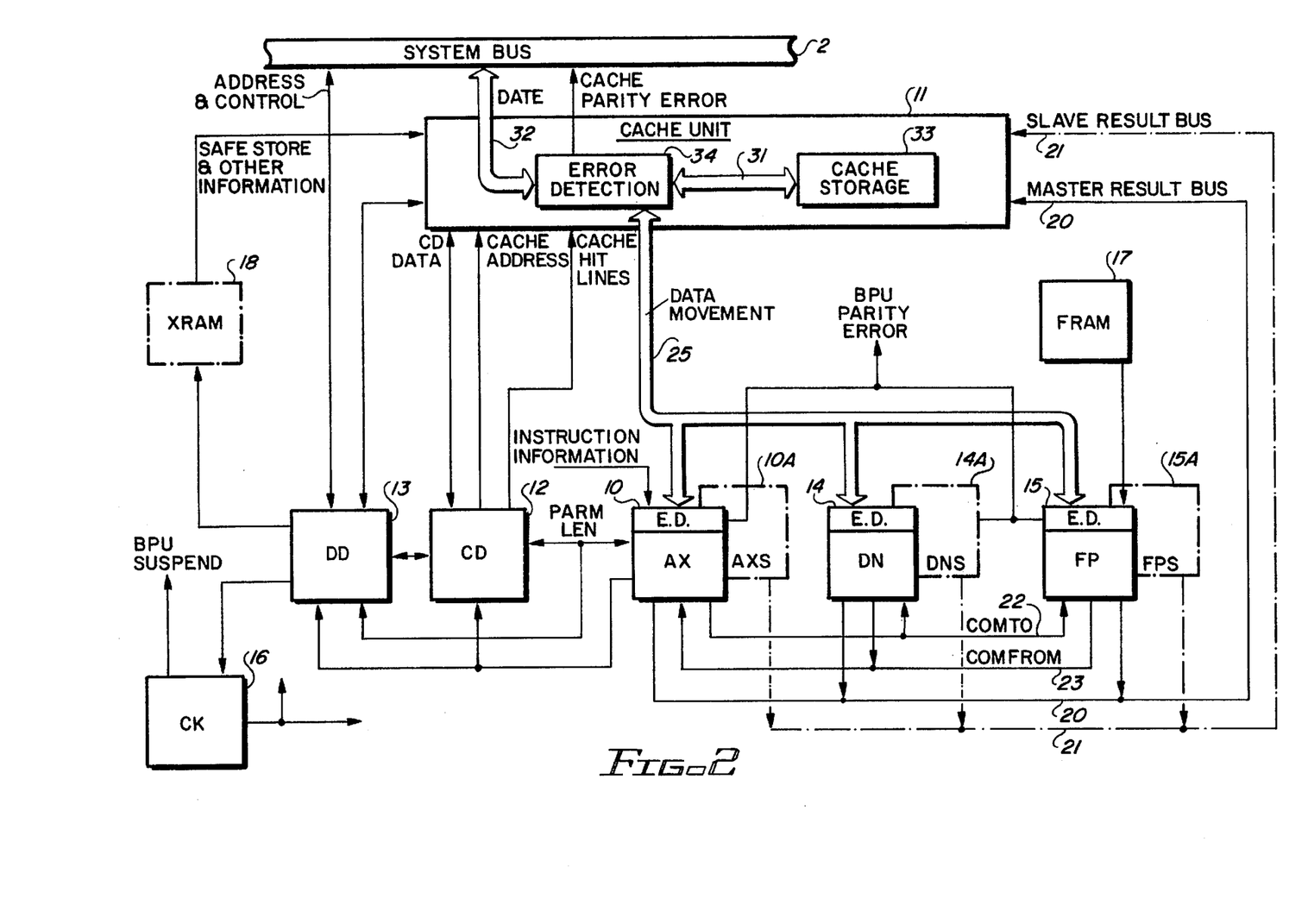
FIG. 2 is a general block diagram of a central processing unit of the central system structure of FIG. 1.

Attention is now directed to FIG. 2 which is a general block diagram of one of the CPUs 5 of FIG. 1. The Address and Execution Unit (AX unit) is a microprocessing engine which performs all address preparation and executes all instructions except decimal arithmetic, binary floating point and multiply/divide instructions. Two identical AX chips 10, 10A perform duplicate actions in parallel, and the resulting AX chip outputs are constantly compared to detect errors. The main functions performed by the AX unit include:

- effective and virtual address formation;
- memory access control;
- security checks;
- register change/use control;
- execution of basic instructions, shift instructions, security instructions, character manipulation and miscellaneous instructions.

The cache unit 11 includes a data part of 64K bytes (16K words) and a set associative directory part which defines the main memory location of each 64-byte (16-word) block stored in the cache data part. Physically, the cache unit is implemented in an array of ten DT chips, a cache directory (CD) chip 12 and a duplicate directory (DD) chip 13.

The specific functions performed by the cache unit 11 include:

- combined instruction and operand data storage;
- instruction and operand buffering and alignment;
- data interface with the system bus 7 (FIG. 1);
- CLIMB safestore file.

The cache write strategy is "store into". If a longitudinal parity error is detected when reading a portion of a modified block from the cache, the block will be swapped out of the cache, corrected by the SCU and written into main memory. The corrected block will then be refetched from main memory upon retry.

Two copies of the cache directory information are respectively maintained in the CD and DD chips which perform different logic functions. The two directory copies allow interrogation of the cache contents from the system bus in parallel and without interference with instruction/operand access from the CPUs and also provide for error recovery. Functions performed by the CD chip 12 include:

- cache directory for CPU accesses;
- instruction, operand and store buffer management;
- virtual-to-real address translation paging buffer.

Functions performed by the DD chip 13 include:

- cache directory for system accesses;
- system bus control;
- distributed connect/interrupt management;
- cache directory error recovery.

Efficient scientific calculation capability is implemented on the Floating Point (FP) chips 15, 15A. The identical FP chips execute all binary floating point arithmetic in duplicate. These chips, operating in concert with the duplicate AX chips 10, 10A, perform scalar scientific processing.

The FP chip 15 (duplicated by the FP chip 15A):

- executes all binary and fixed and floating point multiply and divide operations;
- computes 12 by 72-bit partial products in one machine cycle;
- computes eight quotient bits per divide cycle;
- performs modulo 15 residue integrity checks.

Functions performed by the FP chips 15, 15A include:

- executes all floating point mantissa arithmetic except multiply and divide;
- executes all exponent operations in either binary or hexadecimal format;
- preprocesses operands and postprocesses results for multiply and divide instructions;
- provides indicator and status control.

Two special purpose random access memories (FRAM 17 and XRAM 18) are incorporated into the CPU. The FRAM chip 17 is an adjunct to the FP chips 15, 15A and functions as an FP control store and decimal integer table lookup. The XRAM chip 18 is an adjunct to the AX chips 10 10A and serves as a scratchpad as well as providing safestore and patch functions.

The CPU also employs a Clock Distribution (CK) chip 16 whose functions include:

- clock distribution to the several chips constituting the CPU;
- shift path control;
- maintenance;
- interface between CMU and CPU;
- provision of clock stop logic for error detection and recovery.

The DN chip 14 (in parallel with the DN chip 14A) performs the execution of the decimal numeric Extended Instruction Set (EIS) instructions. It also executes the Decimal-to-Binary (DTB), Binary-to-Decimal (BTD) conversion EIS instructions and Move-Numeric-Edit (MVNE) EIS instructions in conjunction with the AX chip 10. The DN chip both receives operands from memory and sends results to memory via the cache unit 11.

The AX, DN and FP chips, collectively, are sometimes referred to as the Basic Processing Unit (BPU). It was previously noted that the AX, DN and FP chips are duplicated with the duplicate units operating in parallel to obtain duplicate results which are available for integrity checking. Thus, master and slave results are obtained in the normal operation of these chips. The master results are placed onto a Master Result Bus (MRB) 20 while the slave results are placed onto a Slave Result Bus (SRB) 21. Both the master and slave results are conveyed, on the MRB and SRB respectively, to the cache unit 11. In addition, a COMTO bus 22 and a COMFROM bus 23 couple together the AX unit, the DN unit and the FP unit for certain interrelated operations.

The following discussion relates to the events that occur when a cache storage error is detected in a multiprocessor system and the data flow is from a first CPU's cache to a second CPU's BPU/cache. This is the more complex of the two cache operand data error scenarios and is the problem to which the subject invention is directed.

The preconditions that must exist for this error to arise are:

1. A CPU must have read a block of data into its cache due to a BPU request.
2. A second (or third or fourth) CPU must request the same block while it is still owned by the first CPU and after the block has had a single bit unexpectedly altered while residing in the first CPU's cache. (Unlike the single processor cache to BPU case, it does not matter if the word in error is the target word; i.e., any error in the cache block leads to the siphon predicament.)

When the CPU that owns the block in error (the sending CPU) enters its data transfer phase in response to the siphon request, the subject process for handling the error is invoked. It includes the following steps:

1. The sending CPU will detect the error when the requested block is read from cache storage. When the first quarter block is transferred to the requesting (receiving) CPU (data flow 28A, 28C in FIG. 3), an error signal will also be sent. The sending CPU will set a flag that specifically identifies this error type and notify its cache control logic (DD chip) of the error. The sending CPU's DD will set the BPU suspend directive and save the row and level information that identifies the defective cache block in the siphon history entry of its cache history register bank. The sending CPU's BPU will then be placed into a hard suspend state.

2. The receiving CPU will receive the error signal from the sending CPU and enter a BPU hard suspend state. This CPU will set an alarm with an error status, for the SP to evaluate, that specifies that it received the error signal from the sending CPU. It will also save information relating to the cache storage row and level that the block was targeted for in its cache history register bank for later SP reference.

3. The SCU will also note the error signal and force the faulting block, with bad parity, into memory (data flow 28A, 28B in FIG. 3). This will result in an alarm to the SP with the page address written into a register reserved specifically for this error type. The SCU will return a bad status signal to the sending CPU which will already be in a hard suspension state.

4. The SP must analyze these events; i.e., it must note that since an SCU alarm was reported in conjunction with a siphon/DT error from one CPU in conjunction with an alarm with a cache parity error indication set from a second CPU that a siphon error has occurred. The SP must then fetch the row and level information that pertains to the cache block in error from both the sending and receiving CPUs via an issuance of a Read DD Error Report directive to each. Next, the SP will use this information to invalidate the block held by the receiving CPU. (The SP will effectively ignore the SCU report although this must be read to ensure that the SCU is unlocked.)

5. The SP will force the correction of the cache block in error which is held by the sending CPU via the issuance of a swap directive, or swap command while specifying the destination memory address of the block being swapped. The swap will result in the failing cache block being written to memory (data movement 29A, 29B in FIG. 3). It is during this write that the SCU will correct the single bit failure. The SP will disable the storage elements in the cache associated with the failing block by disabling its level after the swap completes.

6. When the swap is complete, the SP must extract a certain amount of information from the BPU of the sending CPU. This information is required by the operating system software to increase the likelihood of its instruction retry routines creating a retryable machine state for the failing instruction, 7. The SP will write the failure symptoms and register data of the sending CPU into dedicated storage in main memory to be available for the operating system software to access later.

8. The SP will issue a Resume with Fault directive to command the sending CPU to restart from its suspended state with a parity fault. When the CPU restarts, it will push its state (safestore) from the XRAM 18 into cache and enter the fault handling/instruction retry routines of the operating system software.

9. The operating system software will note the parity fault and examine the information saved in dedicated memory to determine the type of fault. When it is found to be a cache operand error, the operating system software will evaluate the faulting instruction and determine whether it can be retried. The operating system software will use, in some cases, the sending CPU register information that was obtained by the SP to set preexecution states to increase the chances for a successful retry.

10. If the operating system software determines that the instruction associated with the failure is retryable, it will adjust the state that was pushed onto the safestore stack and restart the failed instruction by instructing the sending CPU to pop the stack entry.

11. While the operating system is performing steps 9 and 10, the SP will begin the task of restarting the receiving CPU from its halted state. The SP must extract a certain amount of information from the BPU of the receiving CPU. This information is required by the operating system software to increase the likelihood of its instruction retry routines creating a retryable machine state for the failing instruction.

12. The SP will write the failure symptoms and register data of the receiving CPU into dedicated storage in main memory to be available for the operating system software to access later.

13. The SP will issue a Resume with Fault directive to command the receiving CPU to restart from its suspended state with a parity fault. When the receiving CPU restarts, it will push its state (safestore) from the XRAM 18 into cache and enter the fault handling/instruction retry routines of the operating system software.

14. The operating system software will note the parity fault and examine the information saved in dedicated memory to determine the type of fault. When it is found to be a cache operand error, the operating system software will evaluate the faulting instruction and determine whether it can be retried. The operating system software will use, in some cases, the receiving CPU register information that was obtained by the SP to set preexecution states to increase the chances for a successful retry.

Figure 3:
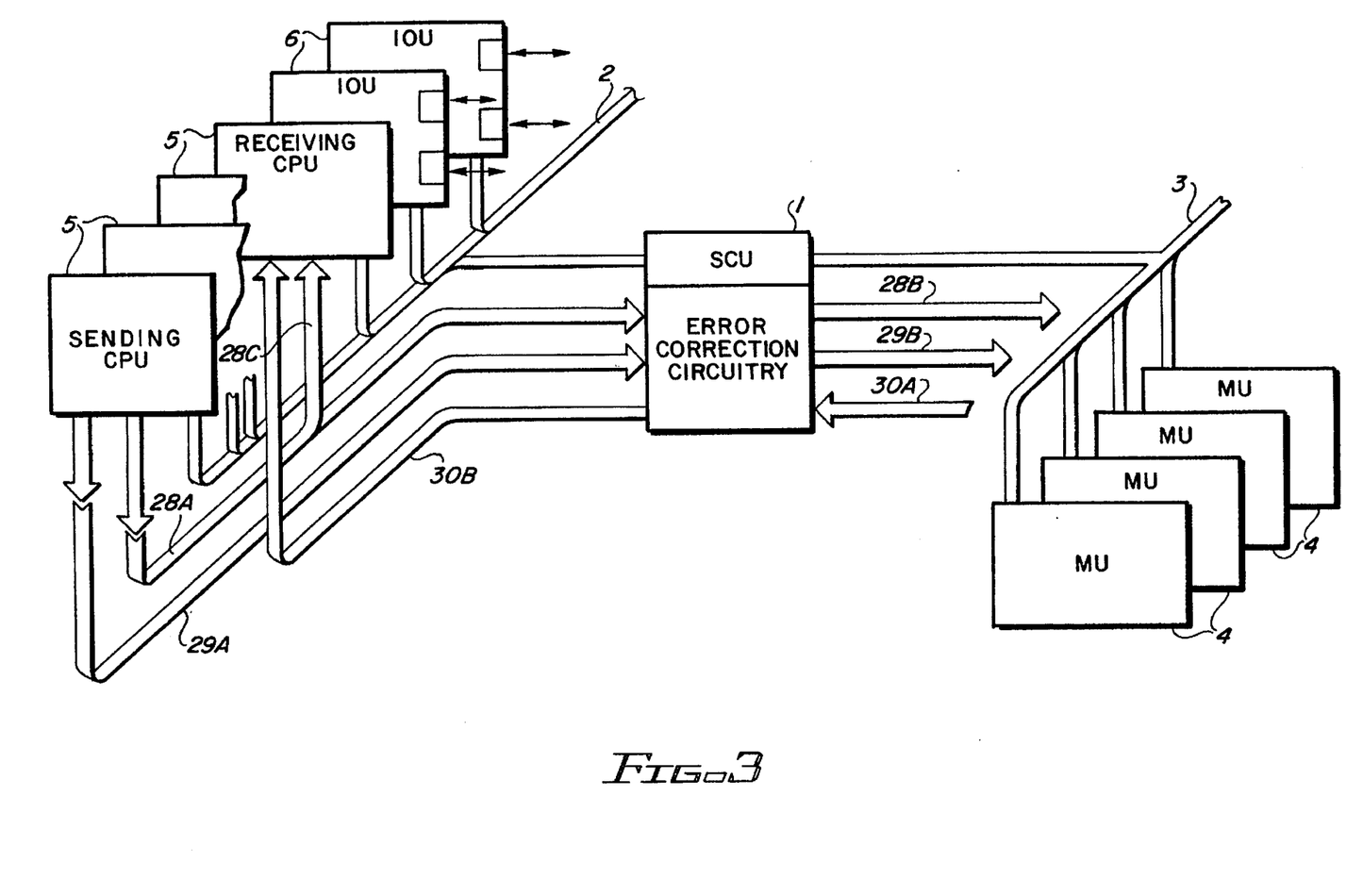
FIG. 3 is a block diagram similar to FIG. 1 showing certain data movements which take place during the practice of the subject invention.

15. If the operating system software determines that the instruction associated with the failure is retryable, it will adjust the state that was pushed onto the safestore stack and restart the failed instruction by instructing the requesting CPU to pop the stack entry. This restart will result in the corrected block being fetched from main memory (FIG. 3, data movement 30A, 30B). The net result is that the affected process is resumed and is completely oblivious to the error.

If a second or third CPU request the same block and received the error signal from the sending CPU, steps 11–15 above would be repeated for each such receiving CPU.

The partitioning of the responsibilities between the CPU, SP and the operating system software is an important consideration in the exemplary implementation, and was determined first upon absolute necessity and then upon component strengths and weaknesses.

Some modest support had to be implemented into the hardware of the exemplary system which must provide the following functionality:

A) Detect the error;

B) Provide information relating to the error (including the identity of the associated cache block);

C) Freeze (halt) the affected BPU in a predictable manner;

D) Alarm the SP;
E) Support directives for:
  1) Swapping the cache block;
  2) Disabling the cache block (or larger cache subdivision such as a level in the exemplary machine); and
  3) Restarting the CPU; and
F) Continue servicing system bus requests throughout the error processing (in order to avoid halting the entire system).

It would at first seem that the CPU hardware should be designed to handle all of these roles without SP intervention. That is, ideally, the CPU itself would automatically swap the block to memory for correction, refetch the corrected block and resume the affected instruction. But those skilled in the art will understand that such an approach is fraught with design error potential and also would sap much of the resources (i.e., designer's time and silicon space) of the system design effort. By distributing the responsibilities among the CPU, the SP and the operating system software, the overall design, development and production costs of the exemplary system, in terms of the commercial physical implementation of the hardware and also in terms of the development effort (the design/implementation responsibilities were not concentrated on one key individual) were significantly reduced. Furthermore, those skilled in the art will readily understand that it is easier to modify software, should bugs be found during early system testing, than to produce new versions of hardware VLSI components. This added flexibility gives the partitioned approach an advantage over concentrating the process in silicon.

The responsibilities of the SP include:
A) Alarm handling;
B) Supervising error processing and correction including:
  1) Issuing a directive to determine the block to swap;
  2) Issuing a directive to swap the block in error;
  3) Handling exceptions that may occur during the swap; i.e., if the error is uncorrectable (e.g., a double bit failure), the SP is programmed to pass this information/status on to the operating system software;
C) Extracting registers from the affected BPU for instruction retry software; and
D) Ensuring that the CPU is in a state that it can be restarted via the issuance of a directive to do so.

It will be noted that the responsibility of the SP does not include determining whether the instruction associated with the failure can be retried. Several factors prohibit it from doing so. First, the algorithms that are required to determine whether some of the more complex instructions in the CPU assembly language instruction set are retryable are extremely complex (and this translates into an extremely large program). Because of expected storage capacity limitations, it was determined that no further storage demands on the SP should be made. In addition, the SP is slow in comparison to the mainframe computer that it supports; therefore with the retry software resident on the mainframe, this processing is much more performant.

The responsibility of the operating system software is primarily that of determining whether or not the affected instruction can be retried. This functionality is enabled after the affected CPU has been restarted with a fault. The operating system software interprets the fault type, and when it is determined to be of the class of error to which the subject invention is directed, it enters its parity fault processing procedure.

The analysis that the operating system software must perform to determine if an instruction can be retried depends on the type of instruction that failed. Essentially, the assembly language instruction set that the exemplary CPU supports consists of instructions that:
  1) Load registers from cache;
  2) Write to cache;
  3) Modify registers;
  4) Read, alter, then write into the same cache word;
  5) Move cache data from one location to another; and/or
  6) Transfer control.

The operating system software instruction retry components analyze these classes of instructions and determine whether a given instruction can be retried in a given circumstance. Superficially, this may seem to be a simple enough task; for example, if a simple "load A-register" (LDA) instruction fails because the data received during the siphon had bad parity, it would be expected that the LDA could be reexecuted following the correction of the cache block. But consider, merely by way of example, what would happen if the LDA had indirect and tally effective address modification associated because the programmer had intended to use this feature to ease implementation of a list search. Then, the operating system software must detect this situation and restore the tally word to its preexecution state. This LDA example is given to illustrate the well known fact that it is the exceptions to the instruction set that make retry algorithms complex.

In the exemplary system, the hardware provides some nontrivial support for recovering from these errors. The hardware provides some register shadowing so that a preexecution value for some registers can be found and used for retry. The truly complex cases (for example, double precision operations) benefit the most from this shadowing. In these complex cases, the operating system software can determine where the preexecution registers reside and use them for the retry. Essentially, the shadowing permits instructions that modify registers to be optimized to the extent that the operation completes, even when corrupt data is read, because a preexecution copy of the registers is available for retry. Without this feature, either these instructions would be deemed unretryable or the CPU's execution would have to be slowed to ensure that, when the corrupt data is detected, the operation is cancelled.

When an instruction can be retried, the operating system software returns control to the affected process, and the process is oblivious to the hardware error. If the instruction cannot be retried or the cache block failure is uncorrectable, then the affected process is terminated.

Figure 4A:
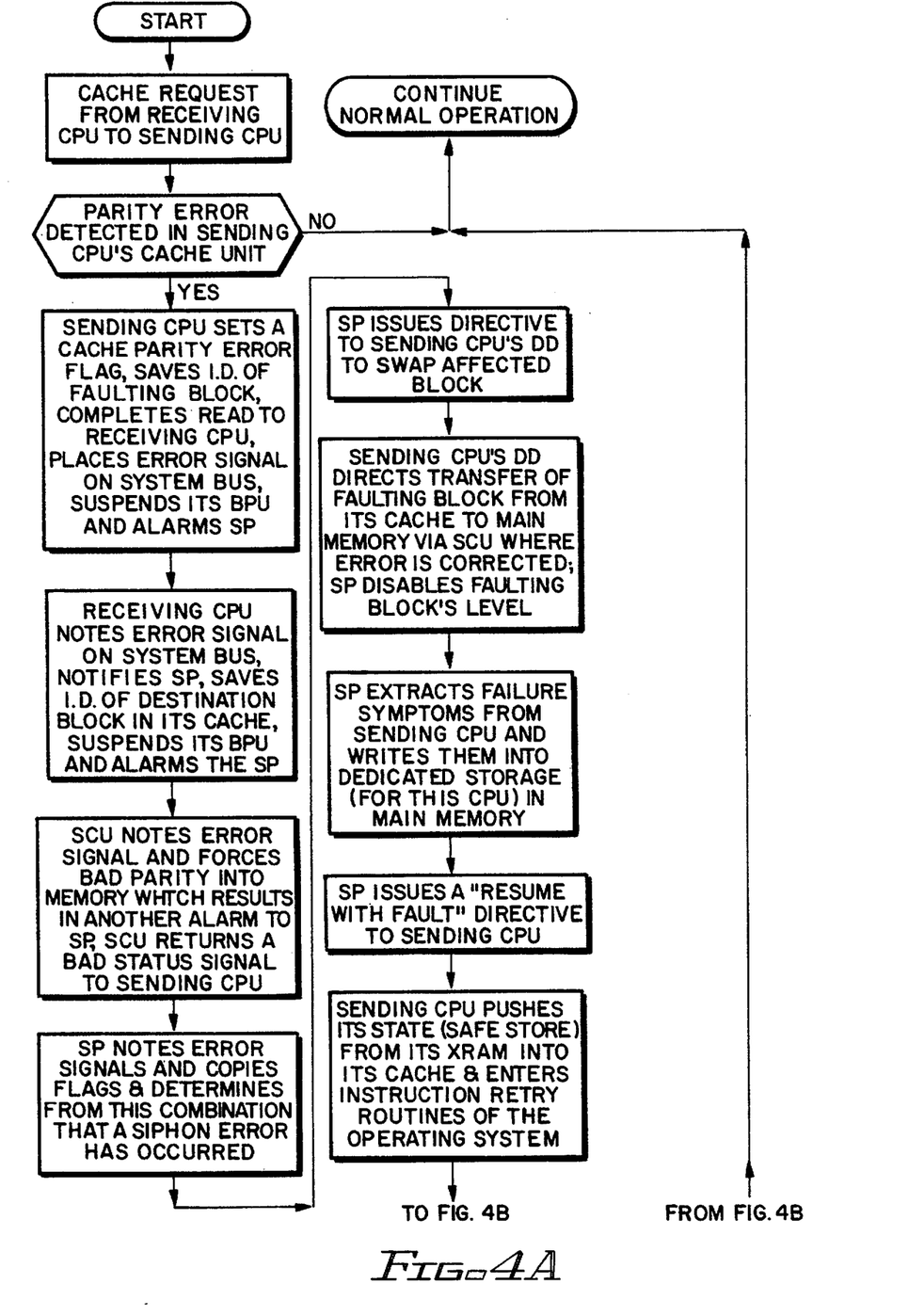
FIG. 4 is a flow chart effecting an alternative disclosure of the invention.
Figure 4B:
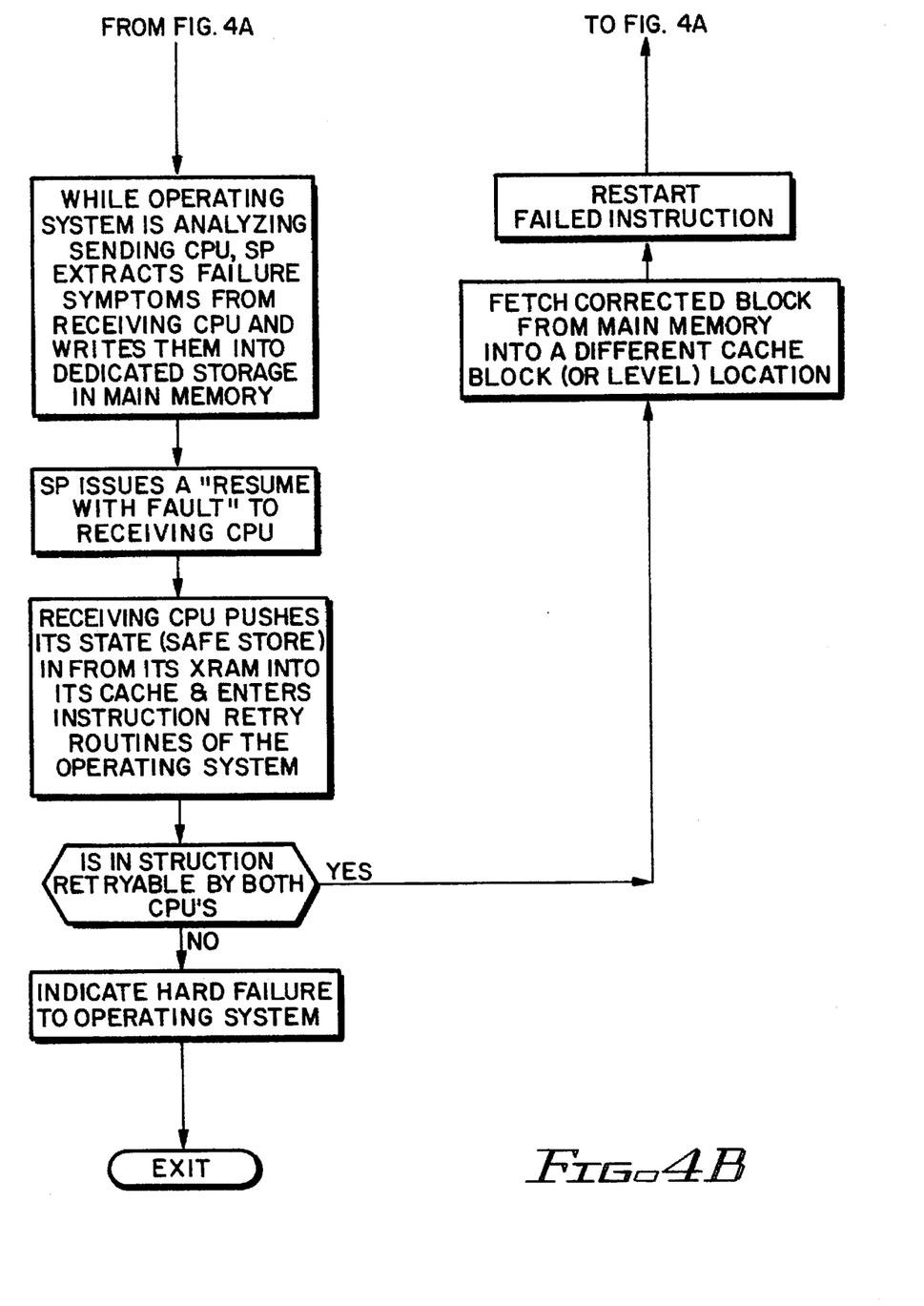

Attention is now directed to the flow chart of FIG. 4. This flow chart is an alternative disclosure of the invention which will be particularly useful to programmers in practising the invention in an environment similar to that of the exemplary system.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:
1. In a fault tolerant multiprocessor computer system including:
  A) a plurality of central processing units with each central processing unit (CPU) including a store-into cache unit;
  B) a main memory;

C) a system control unit,

D) a system bus coupling the plurality of CPU's to each other and to the system control unit; and E) a memory bus coupling said system control unit to the main memory unit; said system control unit incorporating error detection and correction means for correcting a parity error in a block of data written into main memory from a store-into cache of a CPU transmitted therethrough; wherein the improvements comprise:

F) each of the CPUs including means for issuing a siphon command to another CPU, the CPU issuing a siphon command, hereafter a requesting CPU, and the CPU to which the siphon command is issued, hereafter a sending CPU; a siphon command received by a sending CPU causing the sending CPU to read an identified block of data from the store-into cache of the sending CPU, said identified block of data being written into the store-into cache of the requesting CPU;

G) providing the store-into cache unit of each of the CPUs with cache parity error detection means for detecting a parity error in a block of data read out of the store-into cache of a sending CPU, for producing a parity error signal if a parity error is detected in a block of data read out of the store-into cache unit of a sending CPU, for transmitting said identified block of data to the requesting CPU via the system bus, and for transmitting a parity error signal when produced via the system bus to the requesting CPU with said identified block of data; the requesting CPU upon the receipt of a parity error signal from the sending CPU suspending operation; and H) error recovery control means responsive to a parity error signal produced by the cache parity error detection means of the store-into cache unit of the sending CPU in response to the issuance of a siphon command by the requesting CPU for issuing to the sending CPU a swap command, the swap command causing the sending CPU to write the block of data identified by the siphon command which contains a parity error into main memory through the system control unit, said system control unit correcting the parity error in the identified block of data transmitted by the system control unit to main memory, hereafter a corrected block of data, prior to the corrected block of data being written into main memory, for reading the corrected block of data from main memory, for writing the corrected block of data into the store-into cache unit of the requesting CPU, and restarting the requesting CPU.

2. In the fault tolerant multiprocessor computer system of claim 1, which comprises two central processing units.

3. In the fault tolerant multiprocessor computer system of claim 2 in which a block of data consists of sixty four bytes.

* * * * *